(12) United States Patent
Schulz et al.

(10) Patent No.: US 10,037,082 B2
(45) Date of Patent: Jul. 31, 2018

(54) PHYSICAL INTERACTION DEPENDENT TRANSACTIONS

(71) Applicant: PAYPAL, INC., San Jose, CA (US)

(72) Inventors: Egan Schulz, San Jose, CA (US); Michelle Serrano, San Jose, CA (US); Paul Wotel, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 207 days.

(21) Appl. No.: 14/029,456

(22) Filed: Sep. 17, 2013

(65) Prior Publication Data

US 2015/0081544 A1    Mar. 19, 2015

(51) Int. Cl.
  *G06Q 20/32*  (2012.01)
  *G06F 3/01*   (2006.01)
  *G06Q 20/40*  (2012.01)

(52) U.S. Cl.
  CPC .......... *G06F 3/017* (2013.01); *G06Q 20/32* (2013.01); *G06Q 20/40145* (2013.01)

(58) Field of Classification Search
  CPC ..................... G06Q 20/40; H04M 2250/12
  USPC ........................................................ 705/44
  See application file for complete search history.

(56) References Cited

U.S. PATENT DOCUMENTS

| | | | | |
|---|---|---|---|---|
| 2011/0189981 | A1* | 8/2011 | Faith et al. ................ | 455/414.1 |
| 2013/0244575 | A1* | 9/2013 | Forutanpour et al. ....... | 455/41.1 |
| 2015/0012426 | A1* | 1/2015 | Purves ............... | G06Q 30/0623 705/41 |
| 2015/0073907 | A1* | 3/2015 | Purves .................. | G06Q 20/32 705/14.58 |

OTHER PUBLICATIONS https://www.thalmic.com/en/myo , THALMICLABS.

* cited by examiner

*Primary Examiner* — Jessica Lemieux
(74) *Attorney, Agent, or Firm* — Haynes and Boone, LLP (57) ABSTRACT

Systems and methods are provided according to one or more embodiments for conducting transactions based on actions or gestures such as physical interactions between users each having a user device. In that regard, gestures such as a handshake or other physical interactions between users may be detected to determine transaction details such as a payment amount or a value to be transferred from one user via a user device to a recipient via a recipient device. The amount or value may then be transferred based on one or more determinations including proximity between the user or the user device and the recipient or the recipient device, a specific action or gesture, voice commands, facial recognition, preset transfer instructions, a unique identifier, or other close-quarter determinations.

20 Claims, 5 Drawing Sheets

PHYSICAL INTERACTION DEPENDENT TRANSACTIONS

BACKGROUND

Technical Field

Embodiments of the present disclosure generally relate to transactions, and more particularly, to methods and systems for conducting transactions based on physical interactions.

Related Art

Forms of payment such as cash or check are widely used in all aspects of in-person transactions between individuals. For example, in-person payments between individuals may be involved in many situations such as when an individual makes a payment to a friend when a bill is split at a restaurant, when the cost of a gift for a mutual friend is being shared, when a loan is being settled, etc. In some instances, one individual may pay a full amount to a business entity to cover the cost of an item, and another individual may agree to share the cost or cover a portion of the amount at a later time, for example, when the individuals meet again. However, current forms of payment such as cash or check may be inefficient and introduce delays. For example, when an individual wants to contribute or make a payment to a friend when they meet again, the individual may not have a readily-available check, or an exact amount, or enough cash at the time to cover the amount due to the friend.

BRIEF DESCRIPTION OF THE FIGURES

Like element numbers in different figures represent the same or similar elements.

DETAILED DESCRIPTION

In accordance with various embodiments described herein, methods and systems are provided for conducting transactions based on certain actions or gestures such as physical interactions between users each having a user device. Transaction details such as an amount or a value to be transferred from a user to a recipient may be determined based on a detected action or gesture. The transfer may be made to the appropriate recipient having a recipient device based on one or more determinations, for example, proximity, name, facial recognition, or other close-quarter determinations of one or more surrounding users.

In one or more embodiments where one individual having a user device wishes to transfer a payment for a certain amount to another individual also having a user device, the payment may be initiated and processed based on a physical interaction between the individuals. The payment amount may be determined in various ways.

In one example, the payment amount to be transferred may be determined based on a specific type of physical interaction between the individuals such as a handshake, a "high five", a fist bump, a hug, etc. In that regard, certain actions or gestures between the individuals carrying, wearing or otherwise having a user device may be associated with corresponding payment amounts. For instance, a handshake between the individuals having a user device may correspond to a $5 payment amount, a "high five" may correspond to a $10 payment amount, a fist bump may correspond to a $20 payment amount, a hug may correspond to a $30 payment, and so on. It should be noted that an action or gesture may be assigned any corresponding amount as appropriate.

In another example, the payment amount to be transferred may be determined according to transaction information, user information, user device information, or any other appropriate information. For instance, a payment amount may be based on various factors such as user data, a preset amount, past behavior, user device identifiers, or any other appropriate information. In further examples, the payment amount to be transferred may be based on a received input indicating the payment amount via, for example, voice recognition, gesture recognition, an image or video capturing device (e.g., a picture of a bill), etc. of a user device.

In various embodiments, once the appropriate amount to be transferred has been determined, the transfer may be initiated and processed by detecting an appropriate physical interaction between the individuals. For example, when a handshake between the individuals carrying, wearing, or otherwise having a user device is detected, the appropriate amount is transferred from the individual making a payment ("payer") to an individual receiving the payment ("recipient").

The payer and the recipient may be identified in different ways, for example, based on one or more determinations such as proximity, name, facial recognition, or other close-quarter determinations of one or more surrounding users. For example, a recipient may be determined by receiving or detecting specific actions or gestures such as interactions, voice commands, preset instructions, etc. In one instance, an individual may be identified as the payer based on detecting a specific gesture or interaction such as the payer having a hand on top of both the payer's hand and the recipient's hand during a handshake. In another example, an individual may be identified as the payer based on detecting his or her shaking hands using both hands. Examples of other ways for conducting a transaction such as transferring a payment to a recipient may include receiving a voice input or command from the payer specifying or identifying the recipient, recognizing a specific gesture (e.g., a palm up, a hand wave, a pointing finger, a fist, etc.) to transfer an amount to the recipient, presetting an amount to be transferred to a specific recipient next time the payer and the recipient meet, etc.

Also, based on, for example, certain user device identifiers, the appropriate user device may be determined or authenticated such that a user may select to conduct a transaction, for example make a payment to a friend, via a user device based on the user identifier.

Acceleration, location, position, deceleration, velocity and any other pertinent information may be used to determine the type of action or gesture such as physical interactions between the users having a user device. In one example, where a user is using a device such as smart glasses, these actions or gestures may be detected visually by a mounted camera (or any other image or video capturing device).

It should be appreciated that transactions between different individuals may involve many situations or contexts, for example, in addition to making and/or receiving payments, transactions may involve transferring or exchanging of information, or providing access to information, for example, providing access to a password, a list, contacts, or any other content, etc.

Advantageously, transactions between two or more individuals each having a user device may be initiated and processed by using specific actions in a convenient manner and without delay.

Figure 1:
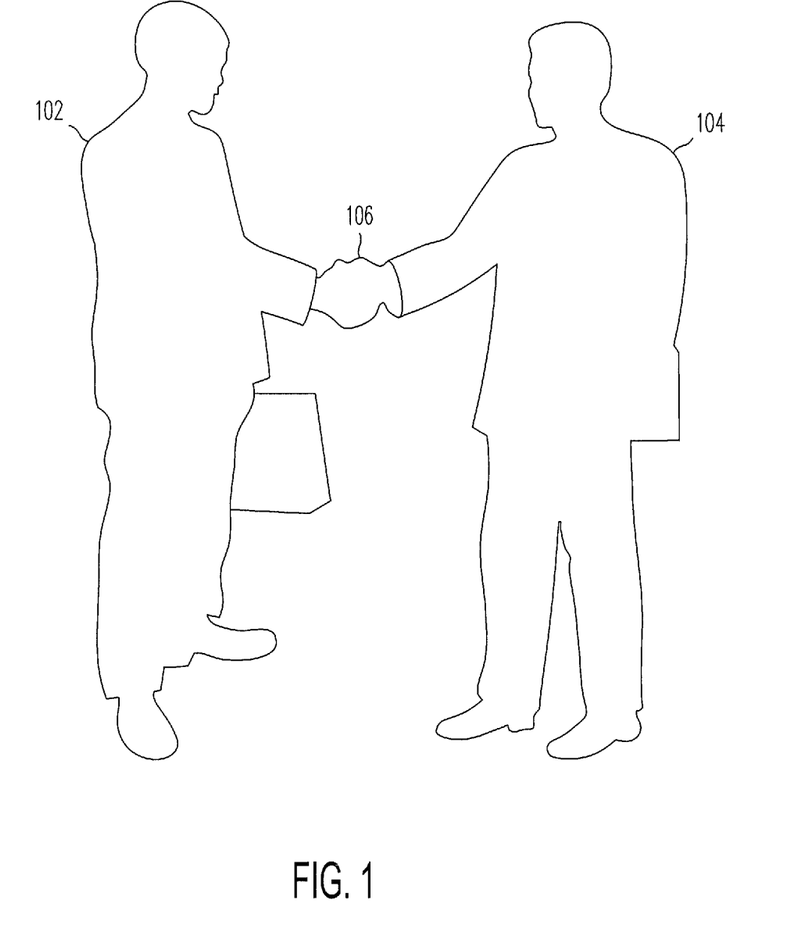
FIG. 1 illustrates a physical interaction between two individuals conducting a transaction according to an embodiment of the present disclosure.

Referring now to the drawings wherein the showings are for purposes of illustrating embodiments of the present disclosure only, and not for purposes of limiting the same, FIG. 1 illustrates a physical interaction between two individuals conducting a transaction according to an embodiment of the present disclosure.

A user 102 that has a user device may interact with a user 104 that also has a user device. A user device may be a wearable device such as a smart watch, smart glasses, etc. or any appropriate device such as a mobile device including a smart phone, a tablet, a laptop, or the like. User 102 and user 104 may interact with each other via an action 106 such as a handshake as illustrated in the embodiment of FIG. 1. However, it should be appreciated that an action 106 may include any interaction between the users such as a fist bump, a high-five, a hug, etc., or any appropriate gesture.

In this regard, action 106 may be used to conduct a transaction between user 102 and user 104. For example, the user device of user 102 may detect the action 106 and as a result, transfer a payment to user 104 via his or her user device. The payment amount and the recipient of the payment amount may be determined in various ways. For example, the payment amount may be transferred from user 102 to user 104 based on a certain characteristic of the physical interaction such as user 102's hand being on top of user 104's hand, based on a voice recognition process wherein user 102 may verbally indicate that a certain amount is to be transferred to user 104, based on a specific gesture, etc. In various examples, the payment amount may be a preset amount, or it may be an amount that corresponds to the detected action, for example, a $5 payment may correspond to the detected handshake.

Figure 2:
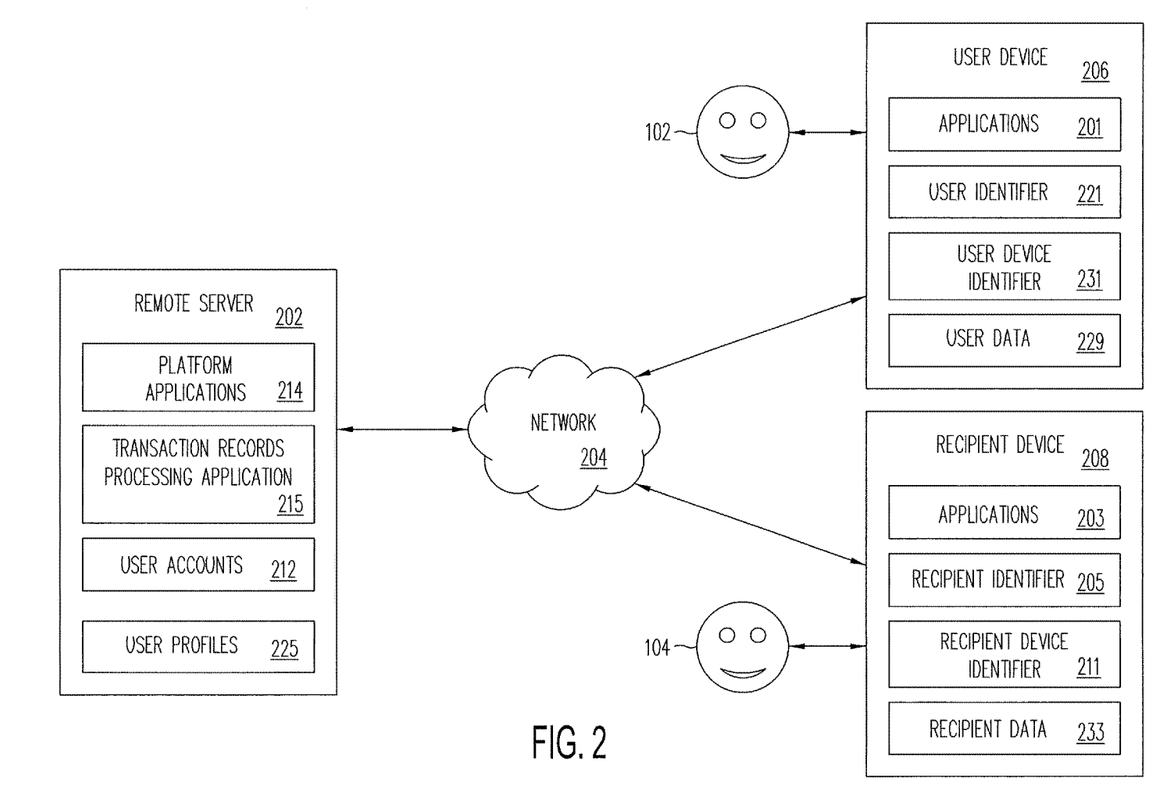
FIG. 2 illustrates a system for conducting transactions based on actions or gestures according to an embodiment of the present disclosure.

Referring now to FIG. 2, a system for conducting transactions based on actions or gestures is illustrated according to an embodiment of the present disclosure.

In an embodiment, a remote server 202 is adapted to communicate or exchange data with a user device 206 and correspondingly a user 102, and a recipient device 208 and correspondingly a recipient 104 via a network 204. Data connections between remote server 202, user device 206 and recipient device 208 may take place, for example, via SMS or a Wireless Application Protocol (WAP) over network 204. In addition, according to one or more embodiments, remote server 202 may have other data connections (not shown), for example, with subscriber Internet companies, Internet financial companies, Internet brokers or other Internet companies. In one embodiment, remote server 202 may be implemented by a payment service provider such as PayPal®, Inc., or eBay®, Inc. of San Jose, Calif., USA.

User device 206 and recipient device 208 may each include one or more processors coupled to one or more memories configured to process downloading, installing and/or running of Applications 201 and 203, respectively, from one or more application developers or from remote server 202. In general, applications may be downloaded from any entity, for example an individual or a corporation that develops one or more portions of an application, for example a software application, operable on different types of user devices.

In one or more embodiments herein, remote server 202 may implement a system for processing transactions such as facilitating the process of reviewing, selecting, purchasing, making payments, etc. In that regard, when an action (e.g., a handshake) between user 102 and recipient 104 is detected (for example as illustrated in the embodiment of FIG. 1), a payment may be initiated and processed from user device 206 of user 102 to recipient device 208 of user 104.

Remote server 202 may maintain a plurality of user accounts 212, each of which may include account information associated with specific users such as user 102 and recipient 104, respectively. For example, in one embodiment, account information may include private or confidential information of a user such as account numbers, passwords, credit/debit card information, bank information, or other information that may be used to facilitate online or other types of transactions between remote server 202 and users (e.g., user 102 via user device 206 and/or recipient 104 via recipient device 208).

According to an embodiment, Platform Applications 214 of remote server 202 may be configured to interact with a user such as user 102 (via user device 206) or recipient 104 (via recipient device 208) so that user device 206 and recipient device 208 are enabled to download applications (e.g. in Applications 201 and 203, respectively) from remote server 202. A user may first register, sign up, or otherwise download an application from remote server 202 via Platform Applications 214 in order to conduct transactions based on detected actions or gestures such as physical interactions according to one or more embodiments of the present disclosure. In this regard, remote server 202 (or any other appropriate entity) may create and/or deploy an application such as a software application in a manner which is compatible with user device 206 and recipient device 208.

Remote server 202 may provide a transaction records processing application 215 that may be configured to receive transaction information from a user, for example, user 102 via user device 206 or recipient 104 via recipient device 208 over network 204, and store the transaction information in a plurality of transaction records, for example in user profiles 225 that are associated with individual user accounts 212. Also, transaction records may be implemented to store transaction information associated with particular applications, for example online, NFC or other types of downloaded applications, between user device 206 of user 102 and recipient device 208 of recipient 104. It will be appreciated that by performing a plurality of transactions by a user such as user 102 or recipient 104, a plurality of transaction records may be stored by remote server 202, for example in user profiles 225, and associated with an appropriate user account 212, which is associated with user 102 or recipient 104.

Access to application transaction records may be controlled by remote server 202, for example, to prevent the storage or retrieval of the transaction records by other parties without the permission of the corresponding user. In this regard, remote server 202 may require the receipt of a security identifier such as a valid password, a user identifier, a username, and/or other appropriate information before transaction records may be stored, changed, and/or retrieved.

In an embodiment, remote server 202 may receive registration information from user 102 using user device 206 and recipient 104 using recipient device 208 to open a corresponding user account 212. It should be appreciated that user 102 and recipient 104 may each provide account information to remote server 202 over network 204 through, for example, a secure connection between user device 206, recipient device 208 and remote server 202. For example, in one embodiment, remote server 202 may provide a webpage that may be viewed by a user through a browser application.

As a result of such registration, remote server 202 may assign, and user device 206 and recipient device 208 may store, a specific user identifier 221 and recipient identifier 205, respectively, that may be used to identify the particular user as having a user account 212 maintained by remote server 202. The user identifier and/or recipient identifier may be implemented, for example, as one or more cookies, operating system registry entries, hardware identifiers, or other types of identifiers. Other data specific to the user may be created and stored by remote server 202, including for example, signature information and user profile 225.

A user profile 225 may be created, for example, based on a user's typical behavior in transactions. For example, typical behavior may indicate the merchants usually visited, the amounts usually spent, locations, the types of items usually purchased, etc. Furthermore, user data included in user device 206 or recipient device 208, for example, content such as contact lists, calendar, etc., may be stored in user data 229 of user device 206 and recipient data 233 of recipient device 208 and/or by remote server 202, for example, in a corresponding user profile 225.

In an example, user data such as contact lists that may include names, phone numbers, device information such as type of device of a listed contact, etc. may be stored by remote server 202 or in user data 229 of user device 106 and/or recipient data 233 of recipient device 208. In an embodiment, user data 229 or recipient data 233, which may include contents such as contact lists, calendar, etc., may be extracted via software tools. In various embodiments, a user may input data or information directly into his or her device as may be appropriate, for example, a user may input the type of device that a contact is using, the phone number or any other user device identifier. Also, a recipient's device identifier may be determined via the device's identifiers specifically associated with that device. In that regard, user device 206 may include a user device identifier 231 and recipient device 208 may include a recipient device identifier 211 that may include user device identification information such as, for example, a Secure Element (SE) number or identification (ID), the user device's unique identifier number such as an International Mobile Equipment Identity (IMEI) number, or a unique number associated with a user of a user (or recipient) device such as an International Mobile Subscriber Identity (IMSI) number, which may be stored inside the user device, for example, in a component such as an SE, a UICC/SIM card, a smart card or any other suitable card of the user (or recipient) device.

User device 206 and recipient device 208 may be implemented using any appropriate combination of hardware and/or software configured for wired and/or wireless communication over a network. For example, in one or more embodiments, user device 206 and/or recipient device 208 may be implemented as a wearable device or a mobile device of user 102 or recipient 104, respectively, in communication with network 204 such as the Internet or another network. In that regard, user device 206 and/or recipient device 208 may be implemented as a wearable device such as a smart watch, smart eyeglasses, etc., or a mobile device such as a tablet, personal computer, wireless telephone, personal digital assistant (PDA), key fob, smart phone, smart card, notebook computer, game console, digital video recorder (DVR), and/or other types of computing devices. Furthermore, user device 206 and recipient device 208 may be enabled for Near Field Communications (NFC), Bluetooth, RFID, online, infrared communications and/or other types of communications.

In one embodiment where user device 206 and/or recipient device 208 is a wearable device (e.g., a smart watch), interactions or data with such a device may be directly exchanged via NFC, Bluetooth, RFID, infrared communications, or the like. In this case, such a device may not itself be connected to a network such as the Internet. That is, a user device or a recipient device such as a smart watch may not have its own Internet connection, but may rather have a connection (e.g., via Bluetooth) to another device that has a connection to a network such as the Internet.

In one example where recipient device 208 does not have a connection to a network such as the Internet, user device 206 and recipient device 208 may pair and recipient device 208 may detect the presence of user device 206 (e.g., using Bluetooth). In this case where the devices pair or know about each other, user device 206 and recipient device 208 may exchange data or interact with each other to detect an action or a gesture, for example, via processing to compare acceleration information of one with acceleration information of the other, etc. Then, user device 206, upon detection of the action or the gesture, may communicate, for example via network 204 to remote server 202, to initiate a transaction such as making a payment to a recipient associated with recipient device 208.

As such, in an embodiment where the devices pair or know about one another, it may not be necessary for the devices to communicate with each other via a network such as the Internet, for example, with remote server 202. Rather, the devices may be able to discover and interact directly with one another, wherein the user device may then initiate a transaction, for example, transfer a payment to the recipient user's account. In this case, a remote server's central coordination of location (or potential associated privacy fears or problems) may not be necessary.

User device 206 and recipient device 208 may include various applications as may be desired in particular embodiments to provide desired features to user device 206 and recipient device 208, respectively. For example, in various embodiments, applications may include security applications for implementing client-side security features, programmatic client applications for interfacing with appropriate application programming interfaces (APIs) over a network, or other types of applications.

User device 206, recipient device 208, and remote server 202 may each include one or more processors, memories, and other appropriate components for executing instructions such as program code and/or data stored on one or more computer readable mediums to implement the various applications, data, and methods described herein. For example, such instructions may be stored in one or more computer readable mediums such as memories or data storage devices internal and/or external to various components of the system, and/or accessible over a network, which may be implemented as a single network or a combination of multiple networks. For example, in various embodiments, network 204 may include the Internet or one or more intranets, landline networks, wireless networks, and/or other appropriate types of networks.

Figure 3:
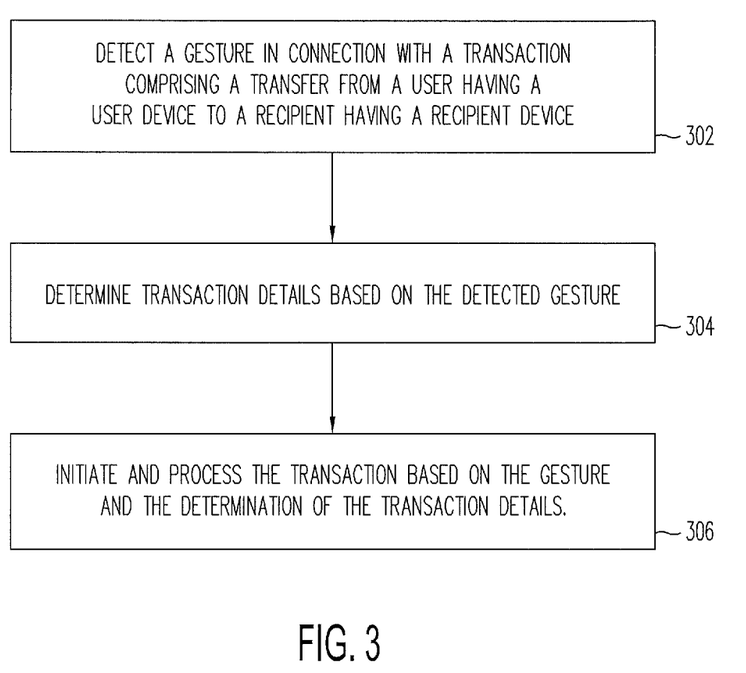
FIG. 3 illustrates a flow diagram of a method for conducting transactions based on actions or gestures according to an embodiment of the present disclosure.

Referring now to FIG. 3, a flow diagram illustrates a method for conducting transactions based on actions or gestures according to an embodiment of the present disclosure. It should be noted that the method of FIG. 3 may be implemented by the system of FIG. 2 according to an embodiment.

User 102 and recipient 104 may download an application for conducting transactions on their respective user device 206 and recipient device 208. According to an embodiment, user 102 and recipient 104 may download the application from platform applications 214 of remote server 202 via network 204 as illustrated in FIG. 2.

In an embodiment, once user 102 and recipient 104 download or install the application onto their respective user device 206 (e.g. in Applications 201) and recipient device 208 (e.g., in Applications 203), transactions may be conducted based on actions or gestures such as physical interactions between the user and the receiver without having to worry about using traditional forms of payment such as cash or a check. For example, instead of a user handing a $20 bill to make a payment to a friend, a $20 amount may be transferred to the friend based on a simple physical interaction, e.g. a handshake, between the user and the friend.

In block 302 of FIG. 3, an action or a gesture may be detected in connection with a transaction comprising a transfer from a user having a user device to a recipient having a recipient device. For example, a transaction may include a transfer of a payment from a user having a user device to a friend or recipient having a recipient device.

A user device may detect an action or a gesture in various ways, for example, by detecting an acceleration, a location, a deceleration, a velocity, a position, etc. that may indicate an action or a gesture such as a handshake between users of respective user devices. In an embodiment, the user device may include an input such as an image or video capturing device (e.g., a camera), a gesture recognition device, etc. that may be used to detect or recognize a specific action or gesture. In one example where a user device is a pair of smart glasses or a like device, such device may include a mounted camera to detect a gesture. In other examples, a user device may include sensors that may detect muscle or tendon movements, for instance, a MYO™ wristband lets a user use the electrical activity in the user's muscles to wirelessly control a user device such as a computer, phone, or other favorite digital technologies.

In block 304, transaction details may be determined based on a detected gesture. In an embodiment where a user having a user device desires to make a payment to another user having a user device, transaction details such as the payment amount to be transferred may be determined.

Transaction details such as the amount of transfer may be determined in various ways. For example, the amount to be transferred may be determined based on a specific type of physical interaction between the individuals such as a handshake, a "high five", a fist bump, a hug, etc. In that regard, certain actions between the individuals carrying, wearing or otherwise having a user device may be associated with corresponding payment amounts. For instance, a handshake between the individuals having a user device may correspond to a $5 payment amount, a "high five" may correspond to a $10 payment amount, a fist bump may correspond to a $20 payment amount, a hug may correspond to a $30 payment, and so on. It should be noted that an action may be assigned any corresponding amount as appropriate.

In an embodiment, a user may assign specific actions or gestures to correspond to specific data (e.g. a handshake may be assigned to correspond to a $5 payment, etc.). In another embodiment, a specific action or gesture may be assigned to correspond to specific data automatically by an application or program. Look up tables or lists may be searched and displayed on a display of the user device, on a web browser, on a manual, etc. As described above, such look up tables or lists may indicate which specific actions or gestures correspond to specific data.

In another example, transaction details such as the amount of transfer may be based on various factors such as user data, past behavior, a preset amount, voice commands, gesture recognition, or any transaction information.

For instance, as described above with respect to the embodiment of FIG. 2, user data or transaction records including for example past behavior may be maintained in user profiles 225 associated with user accounts 212 in remote location 202, or in user data 229 of user device 206 or recipient data 229 of recipient device 208. Such user data and transaction records including, for example, past behavior information, may be accessed to determine transaction details such as amounts to be transferred from a user to a recipient. For example, user data or past behavior may indicate that a payer usually makes a monthly payment of a specific amount such as $20 to a recipient for certain items such as medical services. In that case, based on the timing and type of items, the transfer amount may be determined to be $20.

In another instance, transaction details such as a transfer amount may be preset. For example, a payer may indicate that a preset amount of $20 is to be paid to a specific recipient next time they meet each other. For example, when friends go to a restaurant, Michelle may pay for the full amount of the $40 bill and her friend agrees to pay Michelle half the amount the next time they meet. The friend (or payer) may preset an amount of $20 to be paid to Michelle next time they meet.

Transaction details such as a payment amount may also be based on a received input. For example, a received input may indicate the payment amount via, for example, voice recognition, gesture recognition, an image or video capturing device (e.g., a picture of a bill), etc. Examples of received inputs may include receiving a voice prompt or command indicating a transfer amount such as "Transfer $20". In addition to the transfer amount, the recipient may also be specified, for example, "Transfer $20 to Michelle". Other examples of received inputs may be gesture-based. For example, a hand gesture such as a palm up, a pointing finger, etc. may indicate a specific amount to be transferred and/or to whom.

As such in one or more embodiments where a transaction includes making a payment from a payer to a recipient, once the payer's user device detects an action or gesture such as a physical interaction between the user or payer and the recipient, the user device may transfer a payment amount where the payment amount may correspond to the detected interaction, or it may be based on a preset amount or on received inputs via an input component of the user device as described above according to one or more embodiments.

In block 306, a transaction may be initiated and processed based on a detected gesture and a determination of the transaction details.

In various embodiments, one or more determinations may be associated with at least one of the user or the user device and the recipient or the recipient device. In various embodiments, once a gesture has been detected to determine an amount or value to be transferred, the amount or value may then be transferred based on one or more determinations including, for example, proximity, specific actions or gestures, voice commands (which include, for example a name), facial recognition, preset transfer instructions, recognizing or detecting an identifier such as a unique device identifier, or any other close-quarter determinations of surrounding users, for example, potential recipients around a user or user device.

In an example, a determination may include identifying a recipient or recipient device as one being located in the proximity such as within about 2 feet, 5 feet or any appropriate distance around a user or user device.

Figure 4A:
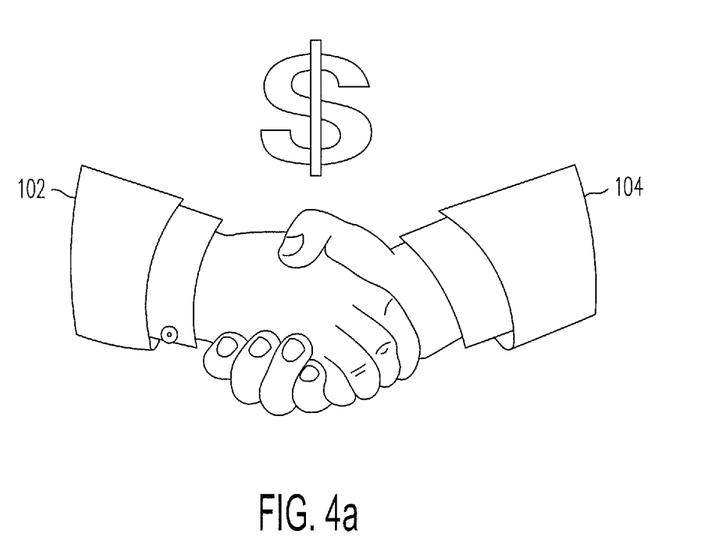
FIGS. 4a and 4b illustrate physical interactions between users according to embodiments of the present disclosure.
Figure 4B:
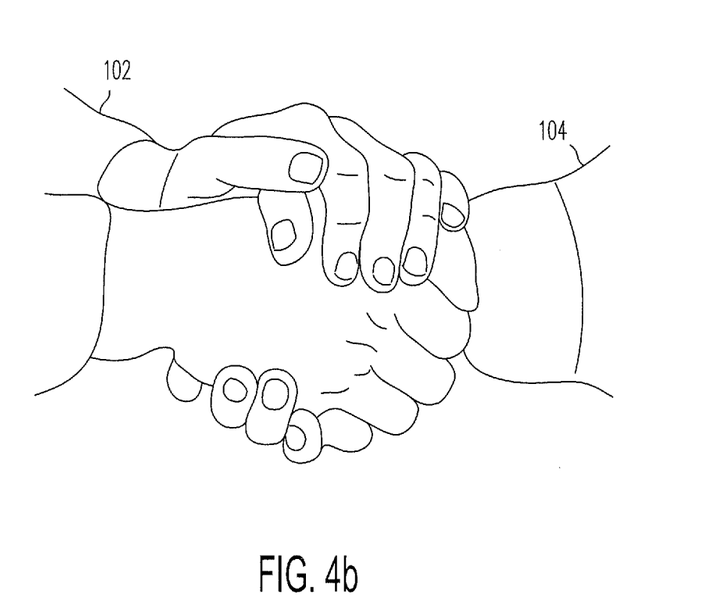

In another example, as described above, where a handshake between the individuals having a user device is detected, the appropriate amount is transferred from the individual making a payment ("payer") to an individual receiving the payment ("recipient"). For instance, where a detected handshake is associated with a $5 payment amount, the user device may transfer $5 upon detecting the handshake. The payer and the recipient may be identified or determined in different ways, for example, by receiving or detecting actions or gestures such as corresponding specific interactions, voice commands, preset instructions, identifiers, etc. For example, referring to FIGS. 4a and 4b, one individual may be identified as the payer and another individual may be identified as the recipient based on detecting a specific action or gesture between the individuals. In the embodiment of FIG. 4a, an individual 104 may be identified as the payer based on having a hand on top or surrounding the recipient 102's hand during a handshake. In another embodiment as illustrated in FIG. 4b, an individual 102 may be identified as the payer based on detecting his or her shaking a recipient 104's hand by using both hands. It should be appreciated that there may be many different actions or gestures that may be used to determine or identify the payer versus the recipient according to one or more embodiments.

Examples of other determinations for transferring data such as a payment amount may include receiving a voice input or command specifying or identifying the recipient such as the name of the recipient (e.g., "transfer $20 to Michelle), using facial recognition (e.g., recognizing Michelle wherein the facial recognition data may be compared with stored user data such as Michelle's photo, social network data, etc.), recognizing a specific gesture (e.g., a hand palm up, a pointing finger, etc.) for a transfer such as a payment amount to a recipient, presetting instructions including the transfer details such as an amount to be transferred to a specific recipient next time the payer and the recipient meet, etc.

In a further example, a determination for transferring data may be based on identifier information of the recipient device. For example, a recipient's identifier may be obtained, for example, by associating a voice command selecting a particular recipient (e.g., "Transfer to Michelle") from the user's contact list. In that regard, the recipient's identifier may be for example the recipient's cell phone number, which may be included in the user's contact list. In various embodiments, an application, which may be downloaded onto Applications 201 of user device 206 and Applications 203 of recipient device 208 as described above, may locate a contact list installed in user device 206 and query the identifier information of each particular contact including, for example, the phone number of each contact, or other types of identifiers.

The recipient device may be authenticated in various ways. For example, a user such as a recipient may be associated with a user account 212 of remote server 202 as described above with respect to the embodiment of FIG. 2. In that regard, user data such as a unique recipient device identifier may be detected and used for identification or authentication purposes such as a phone number, a Secure Element (SE) number or identification (ID), the recipient device's unique identifier number such as an IMEI number, or a unique number associated with a user of a recipient device such as an IMSI number, etc.

In various embodiments, the transaction may be completed via remote location 202, which may be a payment service provider such as PayPal.

Advantageously, the users may engage in transactions without delay or inconveniences posed by current transaction processes that may require, for example, cash, checks, credit cards, etc. to conduct transactions. For example, instead of handing an actual $20 bill or writing a $20 check in payment to a recipient, a handshake between the users may be sufficient to transfer the $20 amount.

Although various components and steps have been described herein as being associated with user device 206, recipient device 208, and remote server 202 of FIG. 2, it is contemplated that the various aspects of such servers illustrated in FIG. 2 may be distributed among a plurality of servers, devices, and/or other entities. For example, in one embodiment, transaction record processing application 215 may be implemented by an entity separate from remote server 202. Accordingly, in such an embodiment, communications described herein performed in relation to transaction record processing application 215 may be provided to a separate entity and need not be routed through remote server 202 in all instances.

Figure 5:
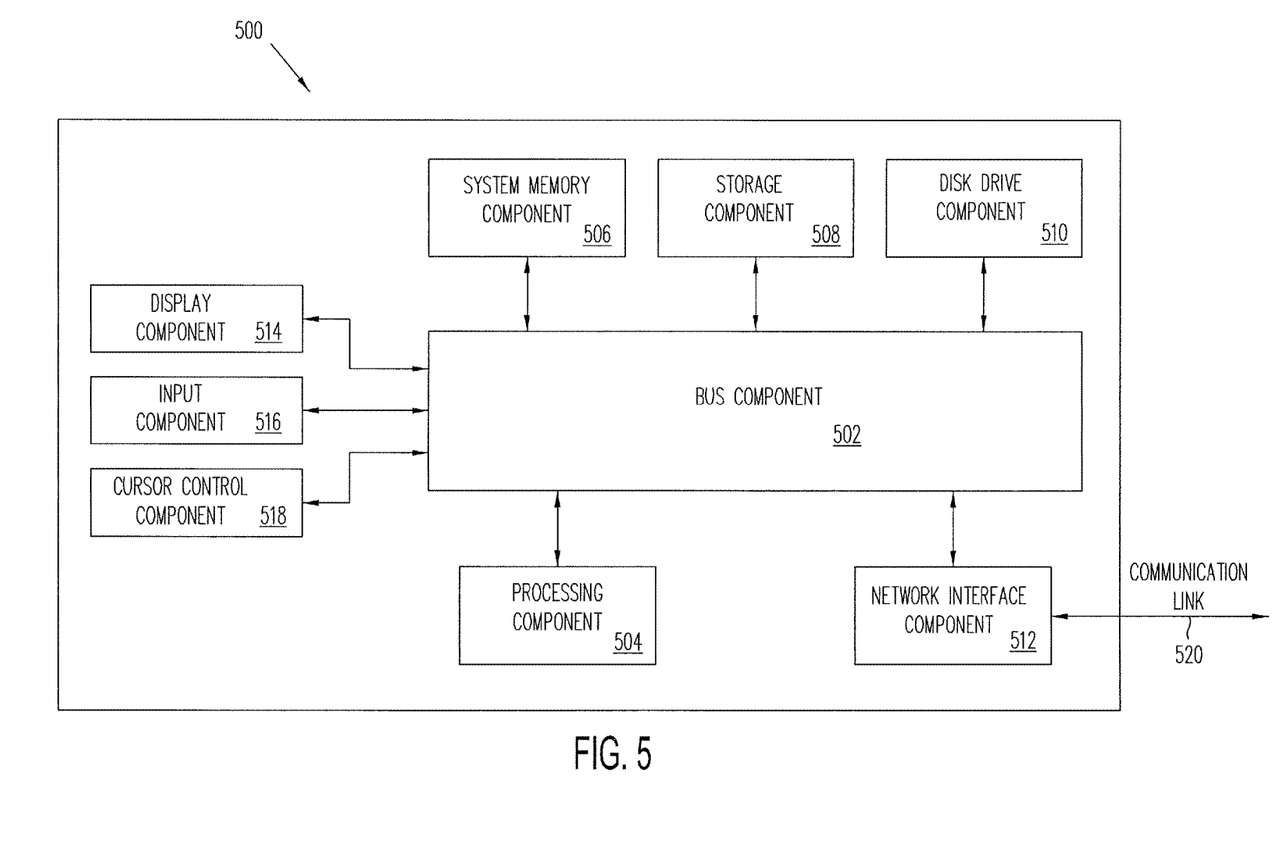
FIG. 5 is a block diagram illustrating a system for implementing a device according to one embodiment of the present disclosure.

Referring now to FIG. 5, a block diagram of a system for implementing a device is illustrated according to one embodiment of the present disclosure.

FIG. 5 is a block diagram of a system 500 suitable for implementing embodiments of the present disclosure, including user device 206, recipient device 208, and remote server 202 server or device. System 500, such as part of a mobile device, a wearable device, a personal computer and/or a network server, includes a bus component 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., gesture recognition device, voice recognition device, image or video capturing device, touchpad, keypad or keyboard), and a cursor control component 518 (e.g., a mouse pad).

In accordance with embodiments of the present disclosure, system 500 performs specific operations by processing component 504 executing one or more sequences of one or more instructions contained in system memory component 506. Such instructions may be read into system memory component 506 from another computer readable medium, such as static storage component 508. These may include instructions to create accounts, process applications, process financial transactions, make payments, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processing component 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store visual representations of the different options for application processing, payments, financial transactions or other transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., network 204 of FIG. 2, LAN, WLAN, PTSN, or various other wired or wireless networks) may perform instruction sequences to practice the disclosure in coordination with one another. System 500 may transmit and receive messages, data, information and instructions, including one or more programs (i.e., application code) through communication link 520 and network interface component 512. Received program code may be executed by processing component 504 as received and/or stored in disk drive component 510 or some other non-volatile storage component for execution.

Where applicable, various embodiments provided by the present disclosure may be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

FIG. 2 illustrates an exemplary embodiment of a network-based system for implementing one or more processes described herein. As shown, the network-based system may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 2 may be deployed in other ways and that the operations performed and/or the services provided by such servers may be combined or separated for a given implementation and may be performed by a greater number or fewer number of servers. One or more servers may be operated and/or maintained by the same or different entities.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure.

Having thus described embodiments of the disclosure, persons of ordinary skill in the art will recognize that changes may be made in form and detail without departing from the scope of the disclosure. Thus the disclosure is limited only by the claims.

What is claimed is:

1. A physical interaction detection system comprising:
   a non-transitory memory; and
   one or more hardware processors coupled to the non-transitory memory and configured to read instructions from the non-transitory memory to cause the system to perform operations comprising:
   detecting, using a wireless protocol, a recipient device that is located within a proximity threshold of a user device;
   detecting, by the user device, a first acceleration information;
   comparing the first acceleration information with a second acceleration information obtained from the detected recipient device;
   detecting, based on the comparing of the first acceleration information and the second acceleration information and based on image data captured by the user device, a gesture comprising a physical interaction between a user and a human recipient in connection with a transaction comprising a transfer from the user having the user device to the human recipient having the detected recipient device;
   generating transaction details by evaluating the detected gesture against a table comprising transaction rules, wherein the transaction rules associate a plurality of gestures with corresponding payment amounts; and
   initiating and processing the transaction based on the detected gesture and the determined transaction details.

2. The system of claim 1, wherein the transaction details further comprise an amount or a value associated with the transaction, and wherein the operations further comprise:
   transferring the amount or value associated with the transaction to the recipient device based on the gesture and at least one input selected from the group consisting of: a voice command, facial recognition data, preset transfer instructions, and a unique identifier.

3. The system of claim 1, wherein the user device is a wearable device.

4. The system of claim 1, wherein the user device includes a sensor that detects muscle movements.

5. The system of claim 1, the operations further comprising:
   determining the transaction details based on at least one of a specific gesture, user data, past behavior, preset transaction details, or a received input.

6. The system of claim 1, the operations further comprising: associating the physical interaction between the user and the human recipient with specific transaction details associated with the transaction.

7. The system of claim 1, wherein the determined transaction details are based on an input received via voice recognition.

8. The system of claim 1, the operations further comprising:
initiating and processing the transaction based on at least one input selected from the group consisting of: a voice command, facial recognition, preset transfer instructions, and one or more unique device identifiers.

9. The system of claim 1, the operations further comprising:
identifying the recipient device based on identifier information of the recipient device.

10. The system of claim 1, wherein the transaction further comprises at least one of making a payment, giving access to information or exchanging information.

11. The system of claim 1, wherein the obtaining of the second acceleration information from the detected recipient device includes pairing the user device and the detected recipient device using a Bluetooth connection.

12. A method for detecting physical interactions comprising:
detecting, using a wireless protocol, a recipient device that is located within a proximity threshold of a user device:
detecting, by the user device, a first acceleration information;
comparing, by one or more hardware processors of the user device, the first acceleration information with a second acceleration information obtained from the detected recipient device;
detecting, based on the comparing of the first acceleration information and the second acceleration information and based on image data captured by the user device, a gesture comprising a physical interaction between a user and a human recipient in connection with a transaction comprising a transfer from the user having the user device to the human recipient having the detected recipient device;
generating transaction details based on the detected gesture and transaction rules accessed from a data structure, wherein the transaction rules associate a plurality of gestures with corresponding payment amounts; and
initiating and processing the transaction based on the detected gesture and the determined transaction details.

13. The method of claim 12, wherein the transaction details further comprise an amount or a value associated with the transaction, and wherein the method further comprises:
determining an amount or value associated with the transaction; and
transferring the amount or value associated with the transaction to the recipient device based on the gesture and at least one input selected from the group consisting of: a voice command, facial recognition data, preset transfer instructions, and a unique identifier.

14. The method of claim 12, further comprising:
detecting, electronically by the one or more hardware processors, the gesture based on a sensor of the user device that detects muscle or tendon movements.

15. The method of claim 12, further comprising:
determining the transaction details based on at least one of a past behavior, preset transaction details, or a received input.

16. The method of claim 12, further comprising:
associating the physical interaction between the user and the recipient with specific transaction details associated with the transaction; and
determining the specific transaction details associated with the transaction based on the detected gesture comprising the physical interaction between the user and the human recipient.

17. The method of claim 12, wherein the transaction details are based on an input received via at least one of voice recognition, gesture recognition, an image capturing device or a video capturing device.

18. The method of claim 12, further comprising:
initiating and processing the transaction based on at least one input selected from the group consisting of: a voice command, facial recognition data, preset transfer instructions, and one or more unique device identifiers.

19. A non-transitory computer readable medium having stored thereon machine-readable instructions executable to cause a machine to perform operations comprising:
detecting, using a wireless protocol, a recipient device that is located within a proximity threshold of a user device;
detecting, by the user device, a first acceleration information;
comparing the first acceleration information with a second acceleration information obtained from the detected recipient device;
detecting, based on the comparing of the first acceleration information and the second acceleration information and based on image data captured by the user device, a gesture comprising a physical interaction between a user and a human recipient in connection with a transaction comprising a transfer from the user having the user device to the human recipient having the detected recipient device;
generating transaction details by evaluating the detected gesture based on transaction rules stored in a table, wherein the transaction rules associate a plurality of gestures with corresponding payment amounts; and
initiating and processing the transaction based on the detected gesture and the determined transaction details.

20. The method of claim 12, wherein the obtaining of the second acceleration information from the detected recipient device includes pairing the user device and the detected recipient device using a Bluetooth connection.

* * * * *